Aug. 19, 1941.   R. W. THOMPSON   2,253,150
CALKING GUN FILLER
Filed Aug. 6, 1938
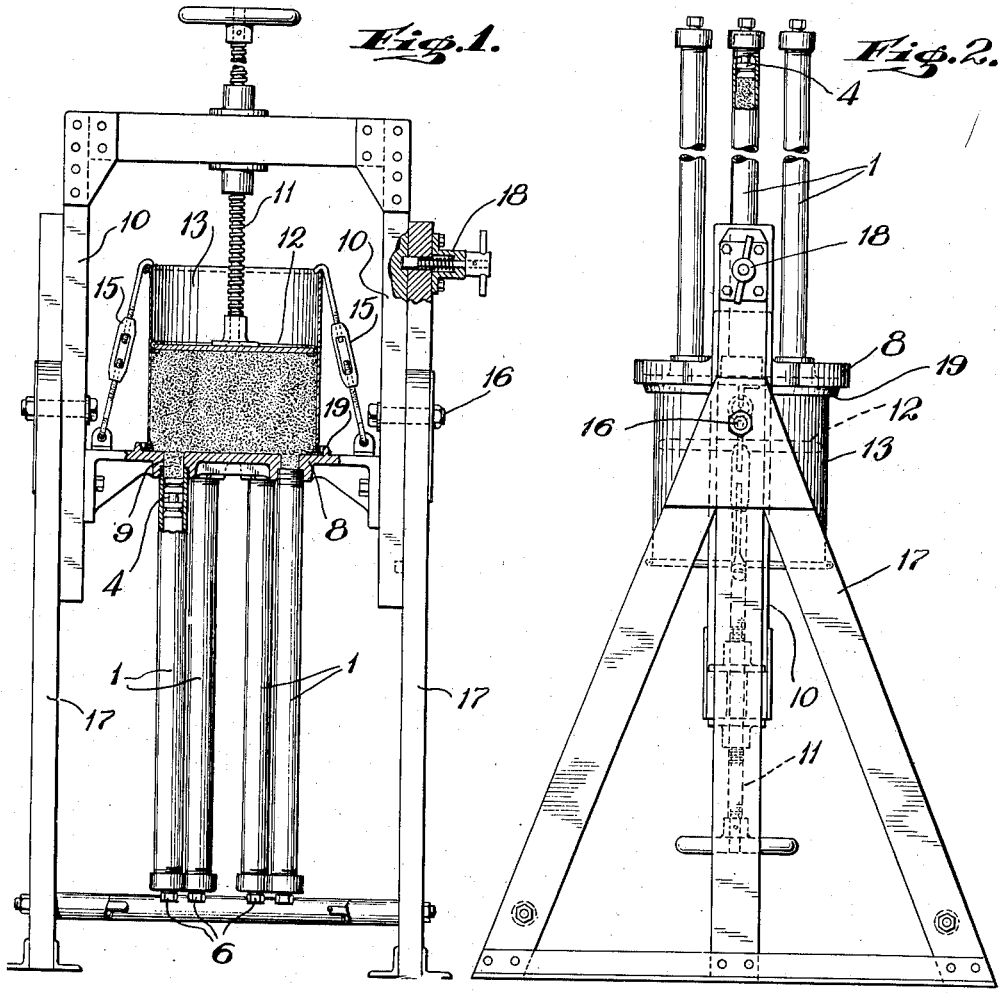
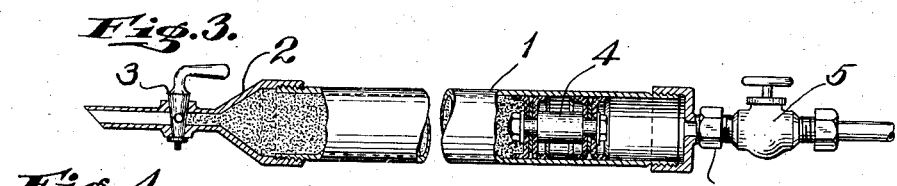
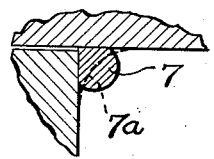
INVENTOR
Robert W. Thompson
BY
Jeffery, Kimball & Eggleston
ATTORNEYS Patented Aug. 19, 1941

2,253,150

UNITED STATES PATENT OFFICE 2,253,150

CALKING GUN FILLER

Robert W. Thompson, Flushing, N. Y.

Application August 6, 1938, Serial No. 223,413

3 Claims. (Cl. 221—78)

The invention refers to the calking of buildings and its purpose is to provide a system whereby calking paste can be applied with less labor and in less time and in better form than heretofore, and with less waste of paste.

Calking paste is used for sealing the cracks in buildings, such as occur around the outside trim in masonry buildings and elsewhere. It is of about the consistency of very soft putty, but extremely sticky. The common method of applying it has been by means of a hand-operated force-gun. Power means of extruding the paste have been proposed, but, so far as I am aware, have not met with practical success, notwithstanding that by the use of power, hand fatigue is avoided and larger force-guns may be used. The larger guns require less frequent fillings and hence make for less interruption to the operation of calking a building, but difficulty is encountered in respect to the filling of the barrels of such guns with the sticky paste. Hand-operated guns are relatively short, about twelve inches long, and can be fairly satisfactorily filled by the use of a scoop or spatula. The longer barrels of the power type, however, being about three times as long as the hand guns, are more difficult to fill and, on account of the extremely sticky nature of calking paste, filling them solid, so as to avoid air cavities in the packed-in mass is impossible. If they are not filled solid, that is to say, if any air is occluded in the mass of paste as the operator packs it into the gun, the extrusion of the paste worm in the process of calking, becomes discontinuous or disruptive. This is because of the compression and subsequent expansion of the imprisoned air, and makes an irregular and wavy worm requiring to be later smoothed down, as in the case of the wavy worm produced by a hand gun, besides producing waste of paste.

By the machine herein described the long gun barrels can be filled solid in a practical manner and with great dispatch.

The drawing illustrates the force-gun and the associated equipment required for obtaining these improved results.

Fig. 1 is a side elevation of the gun-filler;
Fig. 2 is a side view of the same;
Fig. 3 a section of a pneumatic force-gun;
Fig. 4 a perspective of a commercial can of calking paste, and
Fig. 5 a cross-section of a calked seam.

The gun is shown in Fig. 3 and comprises a barrel 1, which may be as long as can be conveniently handled, say 36 inches by 2⅛ or 3 inches diameter. One end is closed by a nozzle cap 2, threaded thereon so as to be easily removed by hand and the nozzle is provided with a plug-type shut-off or valve 3, to control the outflow therethrough. The calking paste in the barrel is subject to the action of a free piston 4, which is subject to air pressure introduced into the other end of the tube through a fitting, which includes an air shut-off valve 5, detachably connected to the cylinder by a coupling, such as indicated at 6, or in any appropriate way. The fitting is connected by the hose to an air compressor not shown, but which may be of a size quite practicable to be carried on the scaffold on which the operator ordinarily stands when at work.

Movement of the piston by the pressure of the compressed air causes the paste to be extruded from the nozzle in the form of a round worm. This worm is laid in the corner or over the crack to be sealed to which it adheres by reason of its very sticky nature and about as indicated at 7 in Fig. 6. It has a round section, forming a bead along the seam and this shape is important in respect to its durability and permanence. Common practice, where the worm as laid is irregular in contour or of varying section is to smooth or smear it down to a concave face as indicated by the dotted line 7$^a$ in Fig. 6. This the operator does with a tool or his finger wetted with kerosene. While it fully seals the seam, this practice has the objection of giving the strip of paste thin feather edges along its sides which soon dry out and curl away from the building surfaces, thereby starting an early failure of the protection. With the round sectioned bead produced by a worm laid continuously so smooth and even as not to require finger smoothing, the process of drying out is greatly retarded and the life of the job correspondingly extended. Complete exclusion of air is indispensable to the production of an even bead on the seam.

When the gun is empty and the free piston therein has been advanced up to the nozzle end the hose is uncoupled and the nozzle cap 2 is unscrewed and, with the piston remaining in its advanced position, the threaded end of the gun barrel is screwed into one of the holes in the bed plate 8 of the gun-filling machine illustrated in Figs. 1 and 2.

The bed plate has preferably six such holes, marked 9, so that several empty gun tubes can be filled at once. The filling is done by forcing a solid column of paste into each gun barrel which forces the free piston back to the other end of the gun.

The bed plate is supported on side frames 10, united by a suitable cross-head carrying the power screw 11, which, in turn, carries the press plunger 12, as will be clear from the drawing. The press cylinder 13 is constituted of the cylindrical body of the commercial receptacle in which the paste is received from the manufacturer, shown in Fig. 4. Such receptacle has removable end covers 14 clenched to the cylindrical body in a customary manner. It is only necessary to remove these end covers and set the body containing the paste on the bed plate, which is provided with an upstanding circular flange 19 to receive it and also fitted with a gasket. As thus placed, the cylinder is locked to the bed by the turn-buckle hooks, or other clamping means, indicated at 15. It will be understood that the press plunger 12 is sized to fit properly within the commercial can body, with or without the interposition of a supplementary follower.

Before the filled guns are removed the press mechanism is inverted so that the bed plate is on top and the gun-barrels project upwardly (Fig. 2). For this purpose, the press proper is mounted on pivots 16, carried in the stanchions 17, so that it may be swung on a horizontal axis. It is provided with a latch 18 adapted to lock the press in either its inverted or its righted position. Fig. 2 shows the press locked in inverted position.

The guns are disconnected from the press while inverted one at a time, or as needed. Their nozzle caps are re-applied and they are then ready for use, being perfectly filled and containing no air imprisoned in the paste mass. On reconnection with the air line the free piston puts the paste under the requisite pressure for extruding the worm and such pressure is maintained constant so that a constant rate of discharge occurs on opening the control valve 3.

One cylinder or can of paste may suffice to fill many guns, in which case the press may, if desired, be kept in the inverted position and the further cylinders filled by extruding the paste upwardly into them, or they may be filled after righting the press, as desired, which is the general practice. In any event, the invertability of the press affords the advantage of preventing escape of paste through the paste outlet holes 9 and avoids the need of any valving for that purpose. Any excess of paste accumulating or present in the paste outlet gradually sinks back into the paste still remaining in the press cylinder.

The viscosity of calking paste is such that while heavy pressure is needed for extruding it from the nozzle at the required operating rate, a slight prolonged pressure or the gravity of the paste itself, will cause it to flow slowly. In warm weather it flows somewhat more freely, though still slowly, so that the guns will fill themselves by gravity, after a time, if the press is left upright with the guns attached.

On account of the tacky and difficult nature of this material, the apparatus described, besides eliminating air pockets in the guns, accomplishes a material economy of paste, avoiding the waste that is ordinarily incident to the operation of filling a tube by the use of a trowel or paddle, there being no excess of paste clinging to the press, or smeared on the tubes, as customarily the case.

The press can be re-charged with paste by backing off the power screw while the press is inverted and placing a fresh can on the press plunger after its upper end cover has been removed. Then, after advancing the screw and righting the press, the can can be attached to the bed and the other cover removed and the plunger head introduced, all without waste or loss of paste or smearing the press with the sticky material. Also, if desired, the fresh can can be installed while the press is in its righted position, provided the material is cold, but it is the preferred practice to fit the open can end to the bed plate, while inverted, and then open the other end of the can and introduce the press plunger after the press has been righted.

Where such removable bottom cans are not available, any other cylinder may take the place of the can body and with the press in its righted position, can be filled with paste in the usual way by a scoop or trowel. Because the press cylinder is of considerable diameter, much larger than a gun barrel, it can be easily filled solid with paste, with no air imprisoned in it likely to pass into the guns and produce a discontinuous or irregular worm.

Reference is made to my co-pending application Serial No. 307,756, filed December 6, 1939, covering matter herein shown but not claimed.

I claim:

1. In a calking system of the kind described, the combination of a press including a bed plate and having a plunger and adapted for containing a supply of calking paste and having a group of normally open paste outlets in its bed plate, each provided with means for quick attachment to a calking gun barrel for the filling of the latter, and means for pivotally supporting such press so that said outlets may be directed either upwardly or downwardly.

2. In a calking system of the kind described, means for simultaneously filling a number of calking gun barrels comprising a filling press pivoted in a supporting frame, means on the frame to lock the press in righted and inverted positions, said press comprising a bed plate having a group of paste outlets individually provided with means for quick attachment to a gun barrel.

3. In a calking system of the kind described, means for filling calking gun barrels comprising a filling press having a bed plate formed with an upstanding rigid flange to make a seal with the end of a commercial can body and with means for clamping such body to the bed plate within the flange and having a plunger adapted to enter the other end of said body, said bed plate having a group of paste outlets individually provided with means for quick attachment to gun barrels.

ROBERT W. THOMPSON.